United States Patent [19]

Nash

[11] Patent Number: 5,024,364
[45] Date of Patent: Jun. 18, 1991

[54] UNITIZED OIL SEAL AND METHOD OF MAKING A UNITIZED OIL SEAL

[75] Inventor: Stephen E. Nash, Lakeland, Mich.

[73] Assignee: Federal-Mogul Corporation, Southfield, Mich.

[21] Appl. No.: 308,920

[22] Filed: Feb. 13, 1989

[51] Int. Cl.⁵ .............................................. F16J 15/32
[52] U.S. Cl. ........................................ 277/35; 29/434; 29/469; 29/509; 156/294; 277/152; 384/486
[58] Field of Search .................... 277/35, 38, 39, 42, 277/43, 45, 47, 48, 49, 65, 95, 178, 25, DIG. 4, 152; 384/481, 482, 484, 485, 486; 29/434, 469, 505, 509; 156/294

[56] References Cited

U.S. PATENT DOCUMENTS

| | | | |
|---|---|---|---|
| 2,240,252 | 4/1941 | Bernstein | 277/39 |
| 2,478,140 | 8/1949 | Ulseth | 277/39 |
| 2,509,461 | 5/1950 | Ulseth | 277/39 |
| 2,592,494 | 4/1952 | Ullmann | 277/95 X |
| 3,021,161 | 9/1959 | Rhoads et al. | |
| 3,101,954 | 8/1963 | Huddle | 277/39 |
| 3,306,223 | 10/1964 | Liebig | |
| 3,527,512 | 9/1970 | Miller | 384/482 |
| 3,561,770 | 2/1971 | Corsi et al. | |
| 3,762,727 | 10/1973 | Jackowski | |
| 3,792,912 | 2/1974 | Howe, Jr. et al. | 384/482 |
| 3,869,181 | 3/1975 | Barber | 384/482 |
| 4,106,781 | 8/1978 | Benjamin et al. | |
| 4,185,838 | 1/1980 | Danner | |
| 4,333,694 | 6/1982 | Howe, Jr. | 384/482 |
| 4,345,770 | 8/1982 | Seech | 277/49 X |
| 4,348,031 | 9/1982 | Johnston | |
| 4,484,752 | 11/1984 | Bentley | |
| 4,513,976 | 4/1985 | Bently et al. | 277/25 |
| 4,516,783 | 5/1985 | Mitsue et al. | |
| 4,572,516 | 2/1986 | Symons et al. | |
| 4,721,312 | 1/1988 | Hornberger | |

FOREIGN PATENT DOCUMENTS 2136891  9/1984  United Kingdom ................ 384/486

Primary Examiner—William A. Cuchlinski, Jr.
Assistant Examiner—Scott Cummings
Attorney, Agent, or Firm—Lawrence J. Shurupoff

[57] ABSTRACT

A unitized oil seal having an annular inner seal case (12) having a J-shaped cross section formed by an inner wall (24) and a first axial flange (28) interconnected by a first radial flange (26). The oil seal also has an annular outer seal case (14) having a J-shaped cross-section formed by an outer wall (40) which is connected to a second axial flange (44) by a second radial flange (42). A primary seal element (16) is secured to the second axial flange (44) and extends to the outwardly facing surface (54) of the inner wall (24). An auxiliary seal element (18) is secured to the first axial flange (28) and extends to the inwardly facing surface (38) of the outer wall (40). In one embodiment, the primary and auxiliary seal elements (16) and (18) may be cammed over radially extending lips (56) and (58) formed on the inner and outer walls (24) and (40). Separation of the inner and outer seal cases (14) and (16) is resisted by radial pressure exerted by the seal elements and the radial lips.

16 Claims, 2 Drawing Sheets

UNITIZED OIL SEAL AND METHOD OF MAKING A UNITIZED OIL SEAL

BACKGROUND OF THE INVENTION

1. Technical Field

The present invention relates to a unitized oil seal and a method of making unitized oil seals. More particularly, two sealing elements are respectively connected to inner and outer seal cases such that each sealing element engages a relatively rotatable axially-extending circumferential surface formed on the other seal case.

2. Brief Description of the Background Art

Elastomeric unitized oil seals have long been used in automotive applications because the seal case protects the sealing elements during shipment and installation. An oil seal should be easy to assemble and install as well as durable and reliable. In aftermarket repair facilities, methods used to install unitized oil seals vary considerably.

In some instances, improper tools and improper installation techniques are used which can damage the sealing elements. If an elastomeric seal is installed and not properly lubricated after installation, the seal will wear excessively.

When a unitized seal lip is molded of an elastomer which is formed in situ within a unitized seal cartridge, it is virtually impossible to visually inspect the seal lip which is located within the cartridge. Such unitized seals are difficult to nondestructively test in production.

Polytetrafluoroethylene (PTFE) seals offer advantages of low start-up and running torque and may be well-known techniques. Moreover, PTFE seals are self-lubricating and thereby minimize the need for lubrication. In prior art PTFE seal designs, a single PTFE wafer is typically used to line or form the primary seal element. An auxiliary sealing element, or dirt excluder element, may be formed of an elastomeric material. Both the PTFE lined primary seal element and the auxiliary element are normally formed on the same seal case and engage another seal case to form a unitized seal cartridge. Assembly of composite elastomeric and PTFE unitized seals is complicated and visual inspection of the seal elements is precluded by the unitized construction of the seal.

These and other problems are overcome by the unitized oil seal of the present invention.

SUMMARY OF THE INVENTION

According to the present invention, two annular PTFE wafers forming the primary and dirt excluding seal elements of a unitized cartridge oil seal are respectively attached to an inner annular seal case and an outer annular seal case. The inner seal case has an axially-extending inner wall covering a portion of the shaft with a first radial flange extending outwardly from the inner wall to join a first axial flange spaced radially outwardly from the inner wall. The outer seal case has an outer wall covering a portion of the bore.

A second radial flange extends inwardly from the outer wall and joins a second axial flange at a point spaced radially inwardly from the outer wall. A first annular wafer has a radially inner portion secured to the first axial flange of the inner seal case. A radially outer portion of the first wafer extends between the first axial flange and an inwardly facing surface of the outer wall.

The outer portion of the first wafer circumferentially contacts the inwardly facing surface of the outer wall which functions as a wear sleeve for the first wafer. A second annular wafer has a radially outer portion secured to the second axial flange of the outer seal case. The second wafer extends to and contacts an outwardly facing surface of the inner seal case.

The annular wafers may be bonded to the first and second axial flanges, preferably by providing copolymers of tetrafluoroethylene and hexafluoroethylene in conjunction with the wafers at the first and second axial flanges. Alternatively, the wafers may be clamped to the first and second axial flanges to hold them in place. First and second frustoconical surfaces are preferably formed on the distal ends of the first and second axial flanges.

According to another aspect of the present invention, a unitized oil seal includes a primary seal element secured to a second axial flange and an auxiliary seal element secured to a first axial flange. An annular inner seal case having a J-shaped cross-section includes a radially outwardly extending lip which restrains the primary seal element from relative movement in one axial direction. An annular outer seal case having a J-shaped cross-section includes a radially inwardly extending lip which restrains the auxiliary seal element from relative movement in the opposite axial direction whereby the inner and outer seal cases are assembled together to form a unitized seal.

Auxiliary and primary seal elements are substantially frustoconical in shape and extend axially and radially toward the radially extending lips. The primary seal element is cammed radially outwardly and the auxiliary seal element is cammed radially inwardly to respectively contact the outwardly extending lip and the inwardly extending lip.

The method of making a unitized oil seal of the present invention includes forming an inner seal case having an inner wall and a first axial flange interconnected by an inner case radial flange. An inner circumferential portion of a first frustoconical wafer formed of a polymeric seal material is secured to the first axial flange. An outer circumferential portion of a second frustoconical wafer of a polymeric seal material is secured to the second axial flange.

The inner seal case and outer seal case are assembled together coaxially by moving the first axial flange between the second axial flange and the outer wall until the first frustoconical wafer engages a radially inwardly facing surface of the outer wall and said second frustoconical wafer engages a radially outwardly facing surface of the inner wall. First and second wafers may be either bonded or clamped to the first and second axial flanges.

The method of assembling the unitized oil seal may further include camming the first frustoconical wafer radially inwardly over an inwardly extending radial lip formed on the outer mounting wall as the first wafer is moved toward the inner case radial flange with the inwardly extending element locking the first wafer against removal. The method may further include camming the second frustoconical wafer radially outwardly over an outwardly extending radial lip formed on the inner wall as the second wafer is moved toward the outer case radial flange with the outwardly extending lip locking the second wafer against removal.

The method may also include preforming the first and second frustoconical wafers into a frustoconical shape by applying heat and pressure to an annular ring of a polymeric sealing material. The polymeric sealing material is preferably filled or unfilled PTFE.

DETAILED DESCRIPTION

Figure 1:
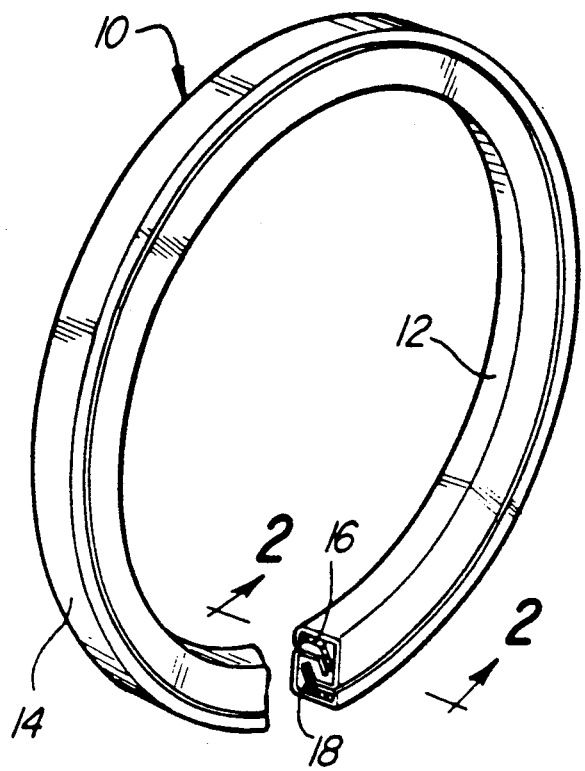
FIG. 1 is a partially sectioned perspective view of a unitized oil seal made in accordance with the present invention.

As seen in FIG. 1, a unitized oil seal assembly 10 includes a radially inner seal case 12 and a radially outer seal case 14. A primary seal element 16 is supported by and secured to the outer seal case 14 and an auxiliary or excluder, seal element 18 is secured to the inner seal case 12.

Figure 2:
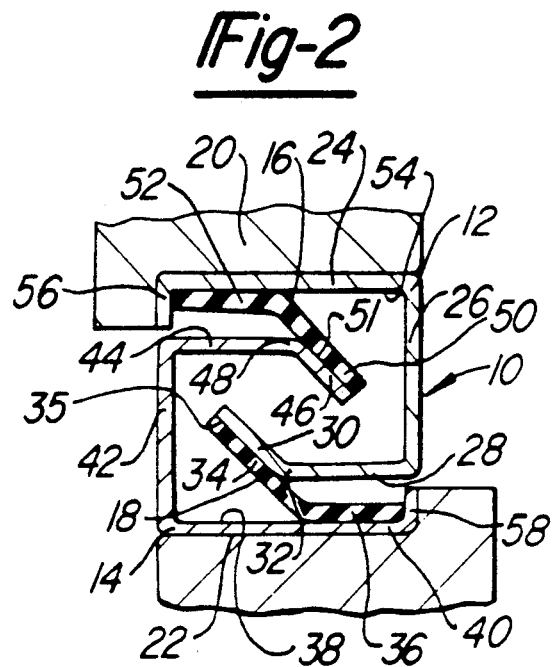
FIG. 2 is a cross-sectional view taken along lines 2—2 in FIG. 1 and showing the seal installed in a typical application.

A typical application of the invention is seen in FIG. 2 wherein the unitized seal assembly 10 is located between radially spaced-apart relatively rotatable elements such as a shaft 20 and a bore 22. The inner seal case 12 is formed with a radially inner wall 24, an outwardly extending first radial flange 26 and a first axial flange 28. An axially and radially extending frustoconical lip 30 is preferably formed on the distal end 32 of the first axial flange 28.

The auxiliary seal element 18 is secured to the frustoconical lip 30 with an inner portion 34 being secured to the outwardly facing surface 35 of the lip 30 proximate to axial flange 28. An outer portion 36 of the auxiliary seal element 18 extends toward and contacts an inwardly facing surface 38 of the outer case 14. The auxiliary seal element 18 maintains an annular wiping contact with the inwardly facing surface 38 to exclude water and contaminants from the seal.

The outer seal case 14 is fitted within the bore 22 such that an outer wall 40 of the outer case 14 is secured to the bore 22. An inwardly extending second radial flange 42 is connected to one end of the outer wall 40 to interconnect the outer wall 40 to a second axial flange 44. An axially and radially extending frustoconical lip 46 is preferably formed at the distal end 48 of the second axial flange 44.

An outer portion 50 of the primary seal element 16 is secured to the inwardly facing surface 51 of the second axial flange 44, preferably at the frustoconical lip 46 proximate to axial flange 44. An inner portion 52 of the primary seal element 16 extends between the second axial flange 44 and an outwardly facing surface 54 of the inner case 12. In the embodiment of FIG. 2, the seal elements 16 and 18 are bonded to the frustoconical lips 30 and 46. Bonding may be performed by incorporating a copolymer of tetrafluoroethylene and hexafluoroethylene in conjunction with the seal elements 16 and 18 and welding the wafers to the inner and outer seal cases by application of heat and pressure.

Preferably, an outwardly extending radial lip 56 is formed at the end of the inner wall 24 opposite from the first radial flange 26 to restrain axial movement of the primary seal element 16 away from the first radial flange. Likewise, an inwardly extending radial lip 58 is formed at the end of the outer wall 40 opposite from the second radial flange 42 to restrain axial movement of the auxiliary seal element 18 away from the second radial flange, thereby forming a unitized seal assembly.

Figure 3:
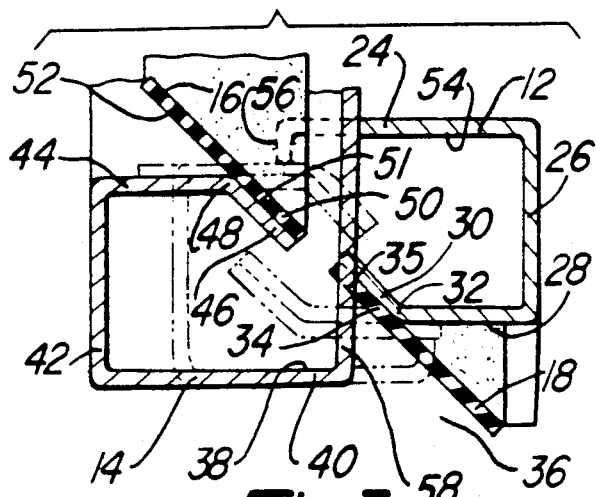
FIG. 3 is an exploded cross-sectional view showing the assembly sequence of the oil seal of FIG. 1.

The inner seal case 12 and the auxiliary seal element 18 are preferably secured together as an inner case subassembly. The seal case subassemblies may be easily visually inspected prior to unitizing wherein the subassemblies are assembled coaxially as shown in FIG. 3 to the position shown in phantom. As the inner and outer seal case subassemblies are moved axially together, the primary and auxiliary seal elements 16 and 18 are respectively cammed radially over the radially outwardly extending lip 56 and the radially inwardly extending lip 58.

The primary element 16 is shifted radially outwardly over the lip 56 while the auxiliary element 18 is shifted radially inwardly over the lip 58. When the subassemblies are fully assembled, the unitized seal assembly 10 assumes the position shown in FIG. 2 with the primary seal element 16 restrained against axial removal of the lip 56 and the auxiliary seal element 18 being restrained by the lip 58. Assembly is simply a matter of coaxially shifting the two subassemblies together while disassembly is resisted by the resilient blocking frustoconical orientation of the seal elements 16 and 18. When assembled the free ends of seal elements 16 and 18 extend respectively along the inner and outer walls 24 and 40 in opposed axial directions.

Figure 4:
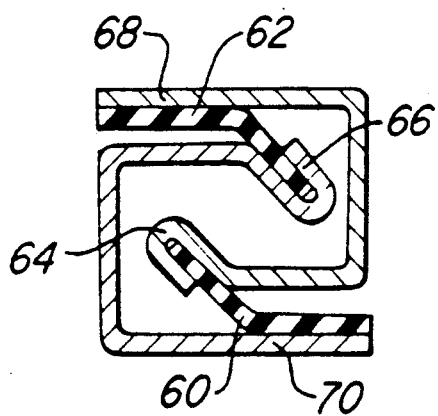
FIG. 4 is a cross-sectional view of an alternative embodiment of the unitized oil seal of the present invention.

An alternative embodiment of the present invention is shown in FIG. 4 wherein primary and auxiliary seal elements 60 and 62 are clamped by reversely turned clamping members 64 and 66, respectively. Instead of using radial lips corresponding to radial lips 56 and 58 shown in FIGS. 2 and 3, the unitized seal assembly of FIG. 4 is held together frictionally by the radial interference and resulting radial biasing forces between the primary and auxiliary seal elements 60 and 62 the inner wall 68 and the outer wall 70.

Figure 5:
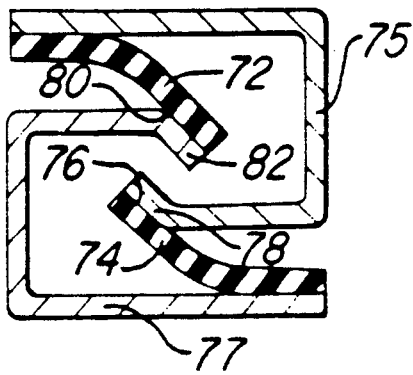
FIG. 5 is a cross-sectional view of an alternative embodiment of the unitized oil seal of the present invention.

Another embodiment is shown in FIG. 5 wherein primary seal element 72 and auxiliary seal element 74 are bonded to inner and outer seal cases 75 and 77, respectively. No radial lips corresponding to radial lips 56 and 58 shown in FIGS. 2 and 3 are provided on the inner and outer seal cases 75 and 77. The auxiliary seal element 74 is bonded to a radially outwardly facing surface 76 of a frustoconical lip 78. The primary seal element 72 is bonded to a radially inwardly facing surface 80 of a frustoconical lip 82.

Figure 6:
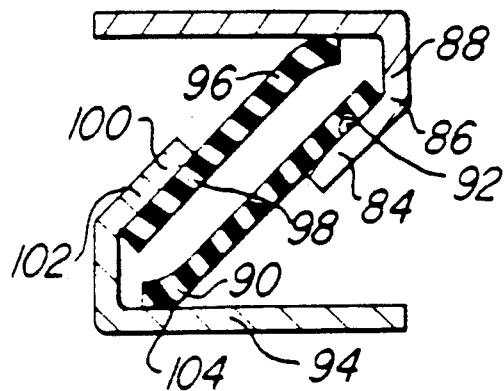
FIG. 6 is a cross-sectional view of another embodiment of the unitized oil seal of the present invention.

As seen in FIG. 6, a radially outwardly extending frustoconical flange 84 is formed at a distal end 86 of a radial flange 88. An auxiliary seal element 90 is bonded to an inner surface 92 of the radially outwardly extending frustoconical lip 84. Outer seal case 94 is bonded to a primary seal element 96 with an outer portion 98 of the primary seal element 96 being bonded to an outer surface 100 of an inwardly extending frustoconical flange 102.

Figure 7:
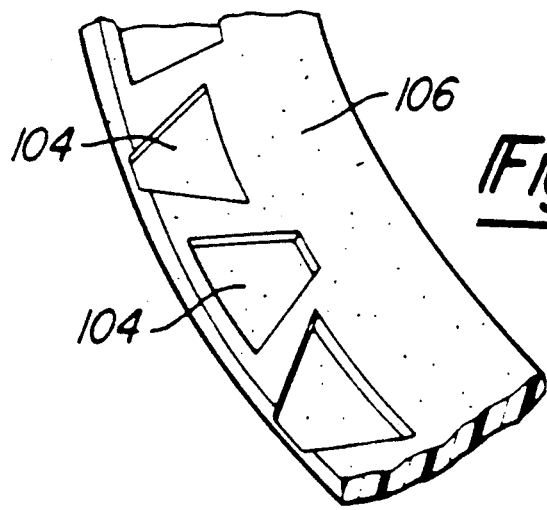
FIG. 7 is a fragmentary perspective view showing hydrodynamic surface features on a sealing element wafer.

In the embodiment shown in FIG. 6, seal elements 90 and 96 preferably would include hydrodynamic surface features 104 such as shown in FIG. 7 wherein a fragmentary section of a seal element 106 is formed with hydrodynamic surface features 104. The hydrodynamic surface features 104 create a hydrodynamic pressure as the seal element 106 is circumferentially rotated.

Figure 8:
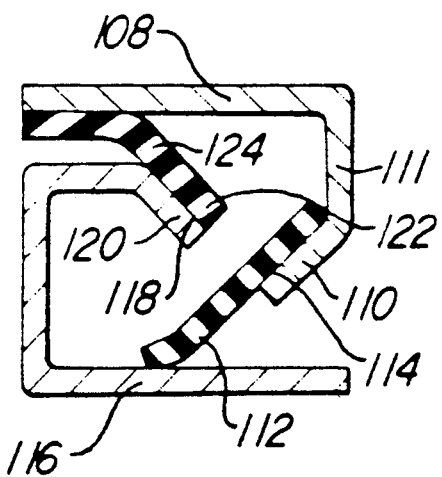
FIG. 8 is a cross-sectional view of an alternative embodiment of the unitized oil seal of the present invention.

Referring to FIG. 8, another alternative embodiment is shown wherein the inner seal case 108 includes an outwardly extending frustoconical flange 110 extending from a radial flange 111. The auxiliary seal element 112 is bonded to the inner surface 114 of the frustoconical flange 110 as in the embodiment shown in FIG. 6. The outer seal case 116 is formed in accordance with outer seal case 77 of the embodiment of FIG. 5 wherein an inner surface 118 of a frustoconical lip 120 is bonded to the radially outer portion 122 of the primary seal element 124.

In each of the embodiments discussed above, the annular wafers are spaced apart from one another in a non-contacting relationship when in use.

It will be understood that the preceding description is of several preferred embodiments of the invention and that many variations and modifications may be made to the specific embodiments disclosed. Applicant's invention should be construed in light of the following claims and all equivalents thereof.

I claim:

1. A seal assembly, comprising:
   an annular radially inner seal case having an axially extending radially inner wall, a first flange extending radially outwardly from said inner wall, and a first axial flange connected to the first flange and spaced from the inner wall;
   an annular radially outer seal case having an axially extending outer wall, a second flange extending radially inwardly from said outer wall, and a second axial flange connected to the second flange and spaced from the outer wall;
   a first annular wafer having a radially inner portion secured to said inner seal case at a position spaced radially outwardly from said inner wall and having a radially outer portion extending between the first axial flange and said outer wall, said radially outer portion circumferentially contacting said outer wall; and
   a second annular wafer having a radially outer portion secured to said outer seal case at a position spaced radially inwardly from said outer wall and having a radially inner portion extending between the second axial flange and said inner wall, said radially inner portion circumferentially contacting said inner wall, said first and second wafers being spaced apart from one another in a non-contacting relationship during use.

2. The unitized seal of claim 1, wherein said first annular wafer is bonded to said inner seal case.

3. The unitized seal of claim 1, wherein said second annular wafer is bonded to said outer seal case.

4. The unitized seal of claim 1, wherein said first wafer is clamped to said inner seal case.

5. The unitized seal of claim 1, wherein said second wafer is clamped to said outer seal case.

6. In the unitized cartridge oil seal of claim 1, a first lip forming a distal end of said first axial flange and a second lip forming a distal end of the second axial flange, said first and second wafers being secured to said first and second axial flanges respectively at said first and second lips, respectively.

7. The seal assembly of claim 1, wherein said first annular wafer comprises a first free end portion and said second annular wafer comprises a second free end portion and wherein said first and second free end portions are disposed in opposed axial directions.

8. A seal assembly, comprising:
   an annular radially inner seal case having an axially extending radially inner wall, a first radial flange extending radially outwardly from said inner wall, and a first flange member having an end portion extending away from said first radial flange and spaced radially outwardly from the inner wall;
   an annular radially outer seal case having an axially extending radially outer wall, a second radial flange extending radially inwardly from said outer wall, and a second flange member having an end portion extending away from said second radial flange and spaced radially inwardly from the outer wall;
   a first annular wafer having a radially inner portion secured to said end portion of said first flange member and a radially outer portion extending between the first flange member and said outer wall, said outer portion sealingly engaging said outer wall; and
   a second annular wafer having a radially outer portion secured to said end portion of said second flange member and a radially inner portion extending between said second flange member and said inner wall, said inner portion sealingly engaging said inner wall, said first and second wafers being spaced apart from one another in a non-contacting relationship during use.

9. The seal assembly of claim 8, wherein said first annular wafer comprises a first free end portion and said second annular wafer comprises a second free end portion and wherein said first and second free end portions are disposed in opposed axial directions.

10. A seal assembly comprising:
   an annular radially inner seal case having a radially inner axial wall, a first flange extending radially outwardly from said inner axial wall and a first frustoconical flange spaced radially outwardly from said inner axial wall and supported by said first flange;
   an annular radially outer seal case having a radially outer axial wall, a second flange extending radially inwardly from said outer axial wall, and a second frustoconical flange spaced radially inwardly from said outer axial wall and supported by said second flange;
   a first annular wafer having a radially inner portion secured to said first frustoconical flange and a radially outer portion extending between said first axially and radially extending flange and said outer axial wall, and engaging and extending along said outer axial wall; and
   a second annular wafer having a radially outer portion secured to said second frustoconical flange and a radially inner portion extending between said second axially and radially extending flange and said inner axial wall, said inner portion sealingly engaging said inner axial wall and extending in a direction axially opposed to said radial outer portion of said first annular wafer, said first and second wafers being spaced apart from one another in a non-contacting relationship during use.

11. A method of making a unitized oil seal comprising the steps of:

forming an inner seal case having an axially extending radially inner wall and a first axial flange interconnected by a first radial flange;

securing a radially inner circumferential portion of a first frustoconical wafer of polymeric seal material to said inner seal case at a position spaced radially outwardly from said inner wall;

forming an outer seal case having an axially extending radially outer wall and a second axial flange interconnected by a second radial flange;

securing a radially outer circumferential portion of a second frustoconical wafer of polymeric seal material to said outer seal case at a position spaced radially inwardly from said outer wall; and assembling said inner seal case and said outer seal case together coaxially by moving said first axial flange between said second axial flange and said outer wall until said first frustoconical wafer engages a radially inwardly facing surface of said outer wall and said second frustoconical wafer engages a radially outwardly facing surface of said inner wall.

12. The method of claim 11 wherein said step of securing said first and second wafers to said inner and outer seal cases respectively is accomplished by bonding.

13. The method of claim 11 wherein said step of securing said first and second wafers to said inner and outer seal cases respectively is accomplished by clamping.

14. The method of claim 11 wherein said step of assembling said inner seal case and said outer seal case together further comprises:

camming said first frustoconical wafer radially inwardly over a radially inwardly extending lip formed on said outer wall as said first wafer is moved toward said second radial flange and locking said first wafer against movement by said inwardly extending lip; and camming said second frustoconical wafer radially outwardly over a radially outwardly extending lip formed said inner wall as said second wafer is moved toward said first radial flange and locking said second wafer against movement by said outwardly extending lip.

15. In the method of claim 11 further comprising the step of preforming first and second frustoconical wafers into a frustoconical shape by applying heat and pressure to an annular ring of polymeric sealing material.

16. The method of claim 11 wherein said first and second frustoconical wafers are formed of PTFE.

* * * * *